Sept. 27, 1949. H. P. FERGUSON 2,483,089
HEADSPACE MICROMETER GAUGE
Filed July 22, 1948
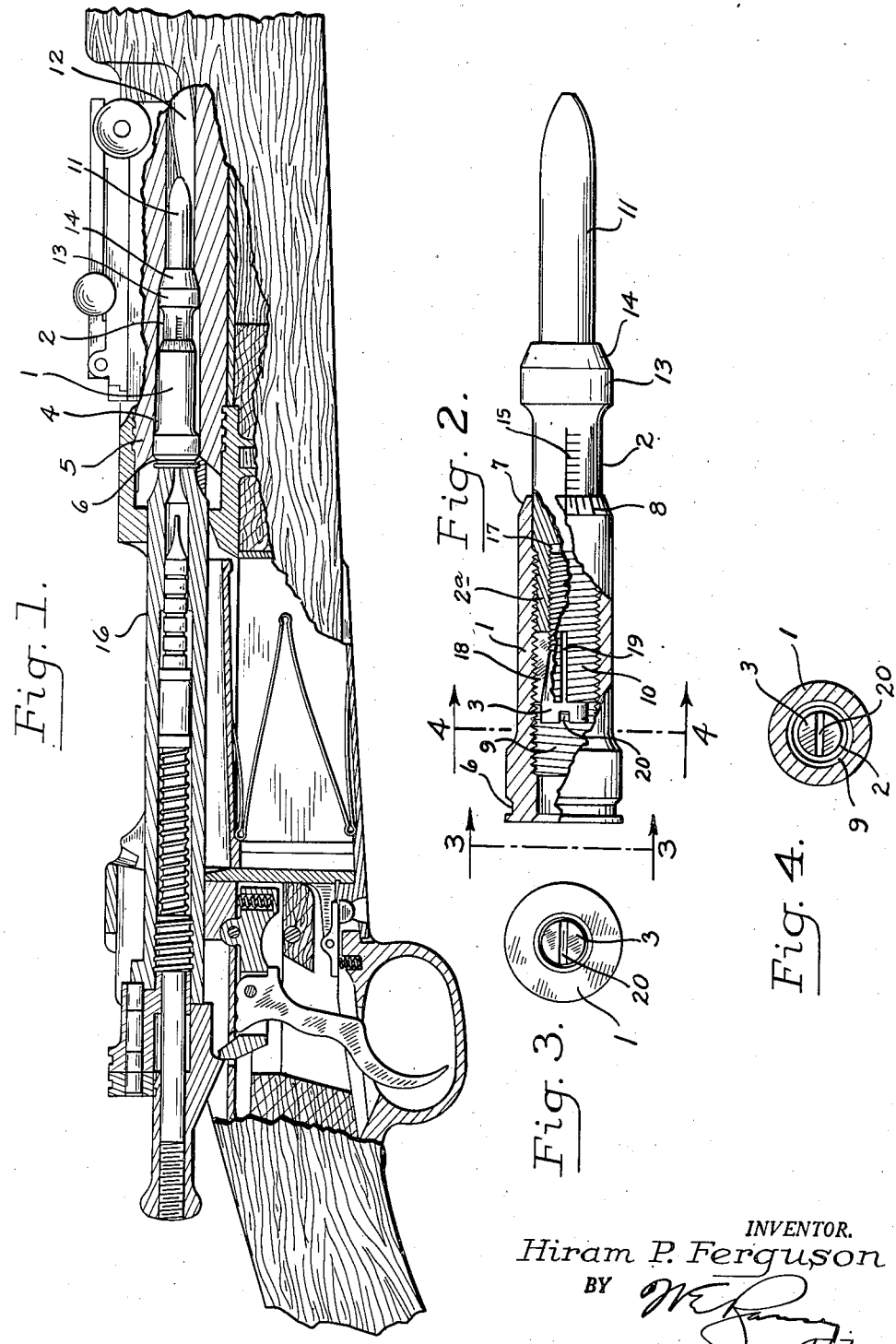
INVENTOR.
Hiram P. Ferguson
BY
Atty.

Patented Sept. 27, 1949

2,483,089

UNITED STATES PATENT OFFICE 2,483,089

HEAD SPACE MICROMETER GAUGE

Hiram P. Ferguson, Portland, Oreg.

Application July 22, 1948, Serial No. 40,102

5 Claims. (Cl. 33—163)

My invention pertains to micrometers, and relates particularly to a micrometer gauge constructed in the shape of a cartridge for measuring the headspace of cartridge chambers in firearms.

A principal object of my invention is the provision of a micrometer gauge which is constructed in the shape of a cartridge, whereby said gauge may be worked into and out of the cartridge chamber by means of the mechanism provided in the firearm.

Another object is to provide a micrometer gauge which may be placed in the cartridge chamber of a firearm for measuring the headspace of said chamber without removing the firing pin or otherwise insuring against accidental damage of the latter.

A further object is the provision in a headspace micrometer gauge of adjustable means for locking said gauge at any selected reading.

A still further object is to provide an adjustable micrometer gauge for measuring the headspace in the cartridge chamber of the rifle, said measurement being determined by the feel of hand pressure required to close the bolt.

These and other objects and advantages of my invention will appear from the following detailed description taken in connection with the accompanying drawing, in which:

Fig. 1 is a fragmentary sectional view of the operating mechanism of a rifle, showing a headspace micrometer gauge embodying my invention arranged in the cartridge chamber of said rifle for measuring the headspace thereof;

Fig. 2 is a plan view of the headspace micrometer shown in Fig. 1 with parts thereof shown broken away to disclose details of construction;

Fig. 3 is an end view of the headspace micrometer shown in Fig. 2 as viewed in the direction of arrows 3—3 in Fig. 2; and Fig. 4 is a sectional view of the headspace micrometer taken along the lines 4—4 in Fig. 2.

Referring particularly to Fig. 2 wherein a micrometer gauge embodying my invention is illustrated in detail, said gauge comprises three parts, viz., a barrel 1, a micrometer screw 2 and an adjustment screw 3. Complementary threads formed in the cooperating parts removably join the latter in operative relation, as is more fully described hereinafter.

The barrel 1 comprises a hollow cylindrical tube. One end of said barrel is of larger outside diameter than the remaining portion, said enlarged section being substantially the same diameter as the rearward end of the cartridge chamber 4 formed in the gun barrel 5. A groove 6 extends circumferentially around said enlarged section to define a simulated rim to be engaged by the ejector mechanism of the rifle. The gauge may thus be readily withdrawn from the chamber 4 in the same manner as cartridges are ejected therefrom. The opposite end 7 of the barrel 1 is tapered, for convenience, and unit graduations 8 are marked about the circumference thereof. Although I have shown the section of the barrel 1 intermediate the enlarged end and tapered to be of reduced diameter, it is understood that the outside diameter of said barrel may conform throughout its entire length to the diameter of the cartridge chamber 4.

The central bore extending longitudinally through said barrel 1 is provided with internal threads 9 disposed intermediate the ends of said bore throughout a substantial portion of its length. Said bore is proportioned and arranged to receive an end section 2a of the micrometer screw 2 therein. The external threads 10 formed about said end section 2a engage internal threads 9 of the barrel 1. In this manner the barrel and micrometer screw are removably and adjustably joined together to form the main body of the gauge.

The end of said micrometer screw opposite the threads 10 is of reduced diameter and pointed at its extremity, forming a nose section 11 which projects beyond the chamber 4 into the bore 12 of the gun barrel 5. It is apparent that said nose section simulates the projectile element of a cartridge. An enlarged section 13 is formed circumferentially about the micrometer screw adjacent the nose section 11. Said enlarged section has a diameter substantially equal to the diameter of the forward end of the cartridge chamber 4, and is tapered toward the nose section to form a shoulder 14. Said shoulder conforms to the taper of the forward end of the cartridge chamber with which it comes into close contact when the gauge is positioned in the chamber.

The section of the micrometer screw 2 between the threads 10 and enlarged section 13 is provided with suitable graduations 15 marked at unit intervals along the longitudinal dimension of said section. The graduations 8 are arranged to measure fractional distances between each graduation 15. For example, with threads 10 formed forty to the inch, the distance between each graduation 15, which measures one revolution of the barrel 1 with respect to the micrometer screw 2, is 0.025 inch. Thus, twenty-five graduation marks 8 arranged circumferentially about the end 7 of the barrel will provide for reading the micrometer to the nearest 0.001 inch. One of the intermediate graduations 15 is designated as zero, i. e. with the barrel end 7 set at said zero mark the distance between the end adjacent the groove 6 and the end of shoulder 14 is equal to the standard length of that portion of a cartridge which lies between the end of the rifle bolt 16 and the tapered forward end of the cartridge chamber 4. The graduations on either side of the zero mark indicate the amount, plus or minus, by which the headspace of the chamber 4 deviates from standard or optimum.

The threaded end of the micrometer screw 2 is provided with a longitudinal bore. Threads 17 are formed in said bore and extend outwardly toward the end of the screw 2. The section 18 between the threads 17 and the end of the screw is tapered outwardly from said threads. Longitudinal slits 19 are formed at spaced intervals about the circumference of said tapered section and extend longitudinally of said screw 2. The adjustment screw 3 is threaded for a substantial portion of its length, said threads being constructed to engage the internal threads 17 formed in the bore of the micrometer screw. The remaining unthreaded length of the adjustment screw tapers outwardly toward its end to form a head which engages the tapered section 18.

A screwdriver slot 20 provided at the end of said head affords means for turning the adjustment screw. As the screw is moved inwardly of the bore, the tapered head spreads the sections 18 radially outward in tighter engagement with the barrel 1. The increased friction between the threads 9 and 10 resulting from said tightening effect increases the force necessary to cause relative rotation between the barrel 1 and micrometer screw 2. The screw 3 may be adjusted to any desired position, and may be set in such manner as effectively to lock the barrel and micrometer screw in fixed relation with each other. It is to be noted that the slot 20 is accessible through the bore provided in the barrel 1. Thus, the micrometer gauge may be rotated to a selected position and then locked by turning the screw 3 until the parts are secured against subsequent rotation.

In the use of the gauge for measuring the headspace of a rifle, the gauge is inserted in the cartridge chamber 4 to the position shown in Fig. 1 of the drawing. Since the gauge is constructed in the shape of the cartridge designed for the particular rifle, the loading mechanism of the latter may be employed for inserting the gauge. Alternatively, the gauge may be positioned in the chamber by hand, if desired. It is recommended that the gauge be set initially to standard or optimum length, i. e. to the zero marking of graduations 8 and 15. With the shoulder 14 in firm contact with the tapered end of the chamber 4, the bolt 16 is moved forward against the enlarged end of the barrel 1.

By observing the amount of hand pressure required to close the bolt, the operator is able to determine the headspace of the cartridge chamber. For example, if the bolt appears to close easily and without striking the end of the barrel 1, the bolt is retracted and the gauge is removed from the chamber by means of the ejector mechanism. Since the first test indicated the headspace to be greater than standard, the gauge is manipulated in such manner as to lengthen the distance between the end of the barrel 1 and the shoulder 14. After setting the adjustment screw 3 to lock the gauge in fixed position, the latter is again inserted in the chamber 4. This procedure is repeated until the proper hand pressure for closing the bolt is obtained. The reading of the gauge may then be compared with the standard tolerance allowed for the rifle to determine whether the gun may be used with safety.

It is to be noted that the gauge embodying my invention may be used without the necessity of first removing the firing pin. In case the trigger is released accidentally while the gauge is positioned in the cartridge chamber, the firing pin will project forwardly into the central bore of the barrel 1. The micrometer screw 2 cannot be threaded into the barrel to a depth sufficient to cause the firing pin to strike the end of the adjustment screw 3. In this manner possible damage to the firing pin is eliminated, and the headspace of the cartridge chamber may be measured while the rifle is in fully assembled condition.

I claim:

1. A micrometer gauge for measuring the headspace of the cartridge chamber of firearms, comprising a circumferentially calibrated barrel having a threaded axial bore and at least a portion of its outside diameter being substantially the same as the diameter of the cartridge chamber of said firearm, means adjacent one end of said barrel for accommodating the ejector mechanism of said firearm, a micrometer screw having an enlarged intermediate section tapered in conformity with the tapered end of said cartridge chamber, said enlarged section having a diameter substantially the same as the diameter of said chamber, one end of said micrometer screw being of reduced diameter and receivable in the barrel bore of said firearm, the opposite end of said micrometer screw having external threads formed thereon proportioned and arranged to engage the threaded bore of said micrometer barrel for longitudinal movement relative thereto, and longitudinal calibrations on said micrometer screw registering with the calibrations on said barrel.

2. A micrometer gauge for measuring the headspace of the cartridge chamber of firearms, comprising a barrel having a threaded axial bore and an outside diameter substantially the same as the diameter of the cartridge chamber of said firearm, a circumferential groove adjacent one end of said barrel for accommodating the ejector mechanism of said firearms, circumferential calibrations on the opposite end of said barrel, a micrometer screw having an enlarged section tapered in conformity with the tapered end of said cartridge chamber, said enlarged section having a diameter substantially the same as the diameter of said chamber, one end of said micrometer screw having external threads formed thereon proportioned and arranged to engage the threaded bore of said micrometer barrel for longitudinal movement relative thereto, and longitudinal calibrations on said micrometer screw registering with the calibrations on said barrel.

3. A micrometer gauge for measuring the headspace of the cartridge chamber of firearms, comprising a circumferentially calibrated barrel having a threaded axial bore and at least a portion of its outside diameter being substantially the same as the diameter of the cartridge chamber of said firearm, means adjacent one end of said barrel for accommodating the ejector mechanism of said firearm, a micrometer screw having an enlarged section tapered in conformity with the tapered end of said cartridge chamber, said enlarged section having a diameter substantially the same as the diameter of said chamber, one end of said micrometer screw having external threads formed thereon proportioned and arranged to engage the threaded bore of said micrometer barrel, longitudinal calibrations on said micrometer screw registering with the calibrations on said barrel, the threaded end of said micrometer screw being slotted longitudinally and having an axial bore therein, and a tapered adjustment screw threaded in the axial bore of said micrometer screw for adjustably securing the micrometer barrel and screw together in selected position.

4. A micrometer gauge for measuring the headspace of the cartridge chamber of firearms, comprising a circumferentially calibrated barrel having a threaded axial bore, a micrometer screw having external threads formed thereon proportioned and arranged to engage the threaded bore of said micrometer barrel for longitudinal movement relative thereto, longitudinal calibrations on said micrometer screw registering with the calibrations on said barrel, the threaded end of said micrometer screw being slotted longitudinally having an axial bore therein, a portion of said bore being tapered outwardly toward the end of said micrometer screw, the remaining portion of said bore being threaded, and a tapered adjustment screw threaded in the axial bore of said micrometer screw for adjustably securing the micrometer barrel and screw together in selected positions, said gauge having the shape of the cartridge designed for said firearm.

5. A micrometer gauge for measuring the headspace of the cartridge chamber of firearms, comprising a barrel having a threaded axial bore and at least a portion of its outside diameter substantially the same as the diameter of the cartridge chamber of said firearm, means adjacent one end of said barrel for accommodating the ejector mechanism of said firearm, circumferential calibrations on said barrel, a micrometer screw having an enlarged intermediate section tapered in conformity with the tapered end of said cartridge chamber, said enlarged section having a diameter substantially the same as the diameter of said chamber, one end of said micrometer screw being receivable in the barrel bore of said firearm, the opposite end of said micrometer screw having external threads formed thereon proportioned and arranged to engage the threaded bore of said micrometer barrel, longitudinal calibrations on said micrometer screw registering with the calibrations on said barrel, the threaded end of said micrometer screw being slotted longitudinally and having an axial bore therein, and a tapered adjustment screw threaded in the axial bore of said micrometer screw for adjustably securing the micrometer barrel and screw together in selected positions.

HIRAM P. FERGUSON.

REFERENCES CITED

The following references are of record in the file of this patent:

UNITED STATES PATENTS

| Number | Name | Date |
| --- | --- | --- |
| 1,351,721 | Eickhoff et al. | Aug. 31, 1920 |